(12) United States Patent
Alessi et al.

(10) Patent No.: US 12,367,745 B2
(45) Date of Patent: Jul. 22, 2025

(54) PASSIVE INFRARED SENSOR WITH PATTERNED LENS

(71) Applicant: STMICROELECTRONICS S.r.l., Agrate Brianza (IT)

(72) Inventors: Enrico Rosario Alessi, Catania (IT); Fabio Passaniti, Syracuse (IT); Antonella Licciardello, Misterbianco (IT); Daniele Baldacchino, San Pietro Clarenza (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 143 days.

(21) Appl. No.: 18/061,918

(22) Filed: Dec. 5, 2022

(65) Prior Publication Data

US 2024/0183719 A1   Jun. 6, 2024

(51) Int. Cl.
| | | |
|---|---|---|
| G08B 13/193 | (2006.01) | |
| G01J 5/05 | (2022.01) | |
| G01J 5/068 | (2022.01) | |
| G01J 5/0806 | (2022.01) | |
| G08B 13/19 | (2006.01) | |

(52) U.S. Cl.
CPC .............. *G08B 13/193* (2013.01); *G01J 5/05* (2022.01); *G01J 5/068* (2022.01); *G01J 5/0806* (2013.01); *G08B 13/19* (2013.01)

(58) Field of Classification Search
CPC ................................ G08B 13/19; G08B 13/193
USPC .................. 250/338.1, 338.3, 338.4, 353
See application file for complete search history.

(56) References Cited

U.S. PATENT DOCUMENTS

| | | | |
|---|---|---|---|
| 6,081,619 A | 6/2000 | Hashimoto et al. | |
| 6,215,399 B1* | 4/2001 | Shpater | G08B 29/183 |
| | | | 340/567 |
| 6,881,957 B2* | 4/2005 | Dougherty | G08B 13/191 |
| | | | 250/338.3 |
| 7,858,941 B2* | 12/2010 | Kaushal | G01J 5/53 |
| | | | 250/354.1 |
| 8,779,361 B2* | 7/2014 | Costello | G01D 5/34715 |
| | | | 257/82 |
| 8,816,283 B2* | 8/2014 | Yon | G01J 5/045 |
| | | | 257/433 |
| 8,952,331 B2* | 2/2015 | Ueda | G01J 5/046 |
| | | | 250/338.4 |
| 9,116,037 B2* | 8/2015 | Claytor | G08B 13/193 |
| 9,117,361 B1 | 8/2015 | Hennigan et al. | |
| 9,410,847 B2* | 8/2016 | Buckley | G01J 5/0205 |
| 9,797,769 B2* | 10/2017 | Herrera Stromberg | ........ |
| | | | G01J 5/0806 |
| 9,830,789 B2* | 11/2017 | Xu | G01J 5/34 |
| 9,927,301 B2* | 3/2018 | Peterson | G01J 5/0806 |
| 10,133,936 B2 | 11/2018 | Hu et al. | |
| 10,445,998 B2* | 10/2019 | Micko | G08B 13/191 |
| 10,902,706 B2* | 1/2021 | Zhevelev | G08B 13/193 |
| 10,973,103 B2 | 4/2021 | Honjo et al. | |
| 10,976,039 B2* | 4/2021 | Radermacher | H05B 47/115 |

(Continued)

*Primary Examiner* — Allen C. Ho
(74) *Attorney, Agent, or Firm* — Seed IP Law Group LLP

(57) ABSTRACT

A sensor device includes a passive infrared sensor, a control circuit, and a lens that directs infrared radiation onto the passive infrared sensor. The lens includes an obstruction that asymmetrically blocks transmission of infrared radiation through the lens. The control circuit is configured to determine the direction of crossing of individuals passing in front of the sensor device based on sensor signals from the passive infrared sensor.

20 Claims, 12 Drawing Sheets

Legend:

Control circuit 104 may include a microprocessor, a microcontroller, a memory array, and/or other processing circuitry

(56) References Cited

U.S. PATENT DOCUMENTS

| | | | |
|---|---|---|---|
| 11,725,990 B2 * | 8/2023 | Castagna | G01J 5/024 250/338.4 |
| 2020/0340658 A1 | 10/2020 | Radermacher et al. | |

\* cited by examiner

Legend:

Control circuit 104 may include a microprocessor, a microcontroller, a memory array, and/or other processing circuitry

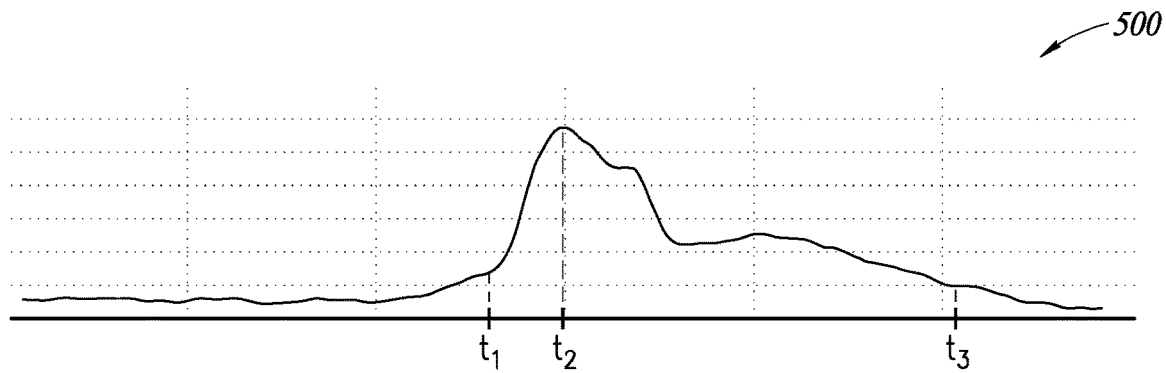
FIG. 5A
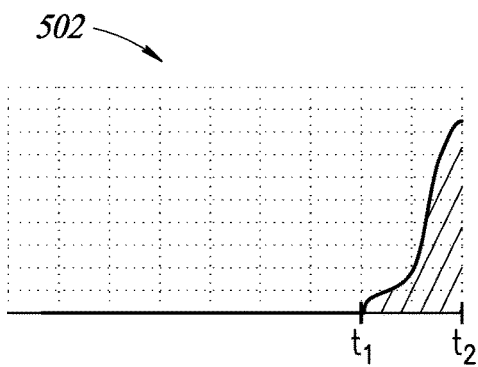 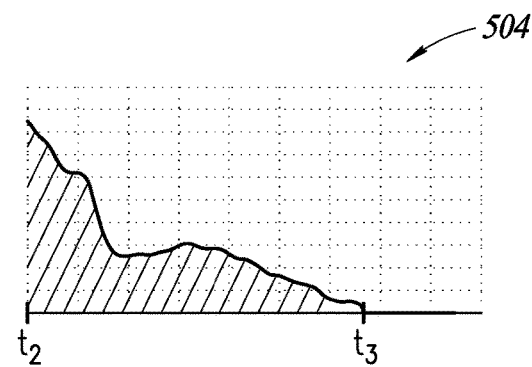
FIG. 5B  FIG. 5C
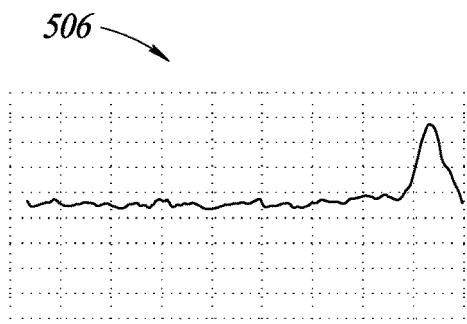 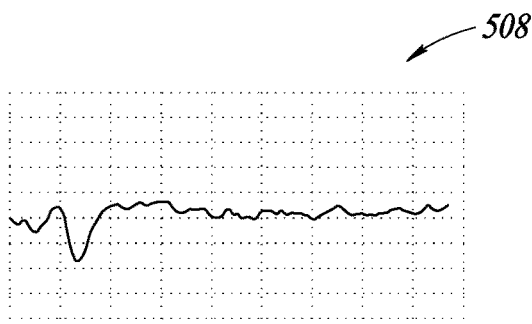
FIG. 5D  FIG. 5E

PASSIVE INFRARED SENSOR WITH PATTERNED LENS

BACKGROUND

Technical Field

The present disclosure is related to passive infrared sensors, and more particularly to bidirectional counting of people crossing through the field of view of passive infrared sensors.

Description of the Related Art

In many situations it may be beneficial to count the number of people passing through a doorway, a gate, checkpoint, or other locations. For example, it can be beneficial to know how many people have entered and exited a building, a room, or a particular area. This can be beneficial for security reasons, for logistical reasons, or for other reasons.

A passive infrared sensor is one type of sensor that can be utilized to detect people passing into or out of an area. The passive infrared sensor can sense infrared radiation emitted by individuals as they pass within the field of view of the passive infrared sensor.

While the passive infrared sensor can be an inexpensive way to sense the passage of individuals through an area, traditional passive infrared sensors also have some drawbacks. For example, it can be difficult to determine the direction of travel of an individual that passes through the field of view of the passive infrared sensor.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

Embodiments of the present disclosure provide a sensor device that is able to effectively and efficiently detect the passage of individuals through an area and to detect the direction of passage of the individuals. The sensor device includes a passive infrared sensor and a lens that focuses infrared radiation from individuals onto the passive infrared sensor. The lens includes an asymmetric obstruction. The asymmetric obstruction occludes a portion of the lens, while leaving another portion of the lens unobstructed. Due to the asymmetry of the obstruction, the passive infrared sensor will generate signals with different characteristics in time for individuals passing in different directions.

The sensor device includes a control circuit that receives the sensor signals from the passive infrared sensor. The control circuit analyzes the sensor signals and determines if an individual has passed through the field of view of the passive infrared sensor and the direction of travel of the individual. The control circuit can also count the number of individuals that have passed through the field of view of the passive infrared sensor in each direction.

In one embodiment, the control circuit utilizes a series of analytic rules to determine passage of an individual and the direction of passage of the individual. The analytic rules can include checking characteristics of the sensor signals against a plurality of threshold values. The threshold values can include timing thresholds, amplitude thresholds, ratio thresholds, and other types of thresholds can be utilized by the control circuit to detect passage and the direction of passage of individuals based on the sensor signals from the passive infrared sensor.

In one embodiment, the control circuit includes an analysis model trained with a machine learning process to determine passage and direction of passage of individuals through the field of view of the passive infrared sensor based on the sensor signals. The analysis model can include a classifier that classifies passage and direction of passage based on the sensor signals.

In one embodiment, a method includes receiving, via an asymmetrically obstructed lens, infrared radiation at a passive infrared sensor and generating, with the passive infrared sensor, sensor data based on the infrared radiation. The method includes determining whether or not an individual has passed in front of the passive infrared sensor by analyzing the sensor data and if an individual has passed in front of the passive infrared sensor, determining a direction of travel of the individual.

In one embodiment, a device includes a passive infrared sensor, a lens positioned to direct infrared radiation onto the passive infrared sensor, and an obstruction that asymmetrically inhibits transmission of the infrared radiation though the lens, wherein the passive infrared sensor generates sensor data based on the infrared radiation. The device includes a control circuit configured to determine whether or not an individual has passed in front of the passive infrared sensor, and a direction of travel of the individual, by analyzing the sensor data.

In one embodiment, a method includes placing, on a lens, an obstruction that asymmetrically inhibits transmission of infrared radiation through the lens and coupling the lens to a passive infrared sensor.

BRIEF DESCRIPTION OF THE SEVERAL VIEWS OF THE DRAWINGS

Reference will now be made by way of example only to the accompanying drawings. In the drawings, identical reference numbers identify similar elements or acts. In some drawings, however, different reference numbers may be used to indicate the same or similar elements. The sizes and relative positions of elements in the drawings are not necessarily drawn to scale. For example, the shapes of various elements and angles are not necessarily drawn to scale, and some of these elements may be enlarged and positioned to improve drawing legibility.

FIGS. 5A-5E are graphs of sensor signals from a passive infrared sensor, according to one embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known systems, components, and circuitry associated with integrated circuits have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Figure 1:
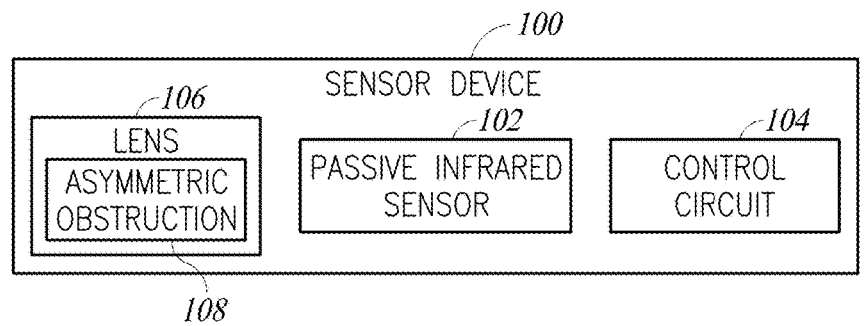
FIG. 1 is a block diagram of a sensor device including a passive infrared sensor and an asymmetrically obstructed lens, according to one embodiment.

FIG. 1 is a block diagram of a sensor device 100, according to one embodiment. The sensor device 100 includes a passive infrared sensor 102, a control circuit 104, and the lens 106 with an asymmetric obstruction 108. As will be set forth in more detail below, the components of the sensor device 100 cooperate to efficiently and effectively detect the passage and direction of passage of individuals through the field of view of the sensor device 100.

The sensor device 100 may be placed at a location through which individuals pass. For example, the sensor device 100 may be placed at a doorway through which people pass to go into or out of a building, to go into or out of a room in a building, or to go into or out of other types of areas. The sensor device 100 may be placed in such a manner that individuals will pass from left to right or from right to left through the field of view of the sensor to enter or leave the doorway. The sensor device 100 can detect when an individual passes through the field of view of the sensor device 100 and the direction of travel of the individual. Although an example is given in which the sensor device 100 is placed at a doorway, the sensor device 100 can be placed in various other types of locations. The sensor device 100 can be placed at a gate through which individuals pass, a check point through which individuals pass, or at any other location at which it may be desirable to detect the passage and direction of passage of individuals.

The sensor device 100 includes a passive infrared sensor 102. The passive infrared sensor 102 is sensitive to infrared radiation. Humans more or less continuously emit infrared radiation. When an individual passes by the passive infrared sensor 102, the passive infrared sensor 102 detects the infrared radiation emitted by the individual. The passive infrared sensor 102 emits sensor signals indicative of the infrared radiation received by the passive infrared sensor 102.

In one embodiment, the passive infrared sensor 102 is implemented in an integrated circuit die. The passive infrared sensor 102 may correspond to a transistor having electrical properties that are highly sensitive to temperature. For example, the transconductance of the passive infrared sensor transistor may be highly sensitive to temperature. The integrated circuit may include a material that is transparent to infrared radiation. The infrared radiation may pass through the transparent region to the transistor. The infrared radiation is absorbed by the transistor, resulting in changes in temperature. The changes in temperature result in changes in the transconductance of the transistor. Accordingly, the passive infrared sensor 102 may output sensor signals based on voltages or currents associated with the passive infrared sensor transistor.

In one embodiment the passive infrared sensor 102 can include signal processing circuitry that generates digital sensor data from analog sensor signals. As used herein, sensor signals may correspond to the raw analog signals output in conjunction with a passive infrared sensor transistor. As used herein, sensor signals may also correspond to digital sensor data that results from signal processing of the analog sensor signals. The signal processing circuitry may be part of the same integrated circuit die in which the passive infrared sensor 102 is implemented.

In one embodiment, the passive infrared sensor 102 is a single pixel passive infrared sensor. The use of a single pixel passive infrared sensor results in very low power consumption. Furthermore, a passive infrared sensor transistor of the passive infrared sensor may be operated in a sub threshold region, further reducing power consumption associated with the passive infrared sensor. Alternatively, the passive infrared sensor 102 may include a multi-pixel passive infrared sensor. In one embodiment, the infrared sensor 102 includes a thermal metal-oxide semiconductor (TMOS) sensor.

The sensor device 100 includes a control circuit 104. The control circuit 104 is coupled to the passive infrared sensor 102 and receives sensor signals from the passive infrared sensor 102. In embodiments in which the passive infrared sensor includes digital signal processing circuitry, the sensor signals received by the control circuit 104 may include digital sensor data. Alternatively, the control circuit 104 may receive analog sensor signals from the passive infrared sensor 102 and may generate sensor data from the analog sensor signals.

In one embodiment, the control circuit 104 and the passive infrared sensor 102 are implemented in a single integrated circuit. For example, the control circuit 104 and the passive infrared sensor 102 may be implemented in a single system on chip (SoC). Alternatively, the control circuit 104 and the passive infrared sensor 102 may be implemented in separate integrated circuit dies. The multiple integrated circuit dies of the control circuit 104 and the passive infrared sensor 102 may be packaged together in a single molded package. Alternatively, the integrated circuit dies of the control circuit 104 and the passive infrared sensor 102 may be in separate molded packages. In one embodiment, the control circuit 104 and the passive infrared sensor 102 are implemented on a printed circuit board. Signal traces may conduct sensor signals from the passive infrared sensor 102 to the control circuit 104.

The control circuit 104 can include one or more microprocessors, one or more microcontrollers, or other types of processing circuits. The control circuit 104 may include memory arrays, buffers, registers, field programmable gate arrays, finite state machines, or other types of circuitry for storing and processing data. The control circuit 104 may store software instructions to be executed by the processing circuitry for executing the functions of the control circuit 104.

In one embodiment, the control circuit 104 can use one or more algorithms for analyzing the sensor signals provided by the passive infrared sensor 102. The one or more algorithms can determine whether or not sensor data indicates that an individual has passed through the field of view of the sensor device 100, and the direction of travel of the individual. As will be set forth in more detail below, the control circuit 104 can utilize a plurality of threshold signal intensities, timings, and ratios in detecting passage and the direction of passage of individuals.

In one embodiment, the control circuit 104 includes an analysis model trained with a machine learning process to detect passage and direction of passage of individuals based on sensor signals provided by the passive infrared sensor 102. The analysis model can include a neural network or other type of analysis model. The analysis model can include a classifier that classifies sensor signals from the passive infrared sensor 102.

The sensor device 100 includes a lens 106. The lens 106 directs or focuses infrared radiation from individuals onto the passive infrared sensor 102. For example, the lens 106 may direct or focus infrared radiation onto an opening or transparent region of the passive infrared sensor 102 to the temperature sensitive region of the passive infrared sensor 102.

The lens 106 includes an asymmetric obstruction 108. The asymmetric obstruction 108 inhibits infrared radiation from passing through one or more regions of the lens 106. The result is that a portion of the lens 106 transmits less infrared radiation, or transmits no infrared radiation at all onto the passive infrared sensor 102. The result is that the time distribution of sensor signals from the passive infrared sensor 102 will have different characteristics for individuals passing through the field of view of the passive infrared sensor 102 in different directions. The control circuit 104 analyzes the sensor signals and can detect the direction of travel of the individual based, in part, on the characteristics of the sensor signals resulting from the asymmetric obstruction 108.

In one embodiment, the sensor device 100 is positioned near a doorway facing perpendicular to the doorway. Individuals entering or exiting the doorway will pass laterally from left to right or from right to left in front of the sensor device 100. The asymmetric obstruction 108 may obstruct one lateral half of the lens 106. The obstruction is "asymmetric" in the sense that one lateral half of the lens 106 is more obstructed than the other lateral half of the lens 106. The effect of this is that one half of the lens 106 is less sensitive than the other half of the lens 106. If both halves of the lens 106 were obstructed equally (or symmetrically), then the sensor signals may not as clearly indicate the direction of passage of individuals.

In one embodiment, the asymmetric obstruction 108 includes a material placed on a portion of the surface of the lens 106. The material is opaque to infrared radiation. The material may partially or entirely cover one lateral half of the lens 106, leaving the other half of the lens 106 uncovered. The obstructed half of the lens 106 will transmit less infrared radiation than the unobstructed half of the lens 106. The material may include tape, a thin-film deposited in a thin-film deposition process, paint, or another type of material that may be placed on a portion of the lens 106.

In one embodiment, the asymmetric obstruction 108 includes a material or object that is placed in front of a portion of the lens 106 but that does not contact the lens 106. The asymmetric obstruction 108 may be coupled to a housing 110 or other surface of the sensor device 100 such that the asymmetric obstruction obstructed portion of the lens 106 from receiving infrared radiation.

In one embodiment, the asymmetric obstruction 108 corresponds to scoring on a portion of the lens 106. The scoring can correspond to scratches or other types of damage to a portion of the lens 106 that render that portion of the lens 106 opaque or less transmissive of infrared radiation. Accordingly, a portion of the lens 106 may effectively be less transmissive than another portion of the lens 106 as a result of the scoring or damage to the lens 106.

Figure 2A:
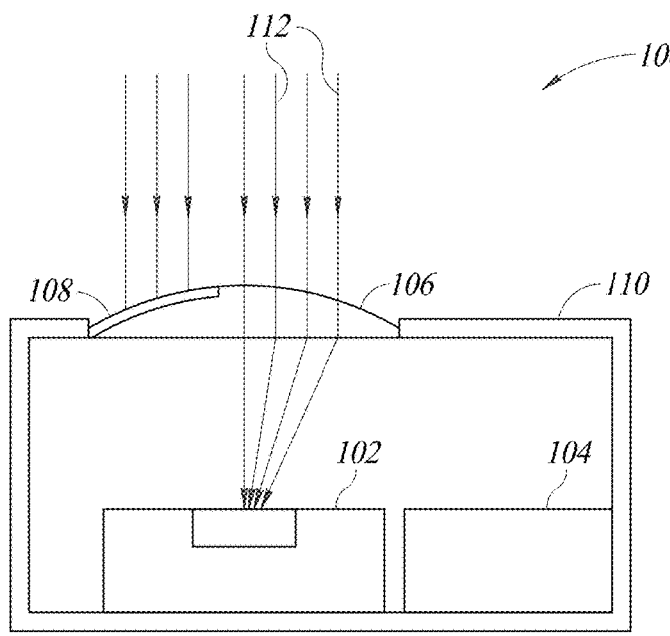
FIG. 2A is an illustration of a sensor device including a passive infrared sensor and an asymmetrically obstructed lens, according to one embodiment.

FIG. 2A is an illustration of a sensor device 100, according to one embodiment. The sensor device 100 includes a housing 110. The housing 110 can include a protective shell or other structures that protect an interior of the sensor device 100. The housing 110 can also facilitate coupling of the sensor device 100 a wall, a door, or to other structures. The housing 110 can include a plastic material, a metal material or other types of materials.

The sensor device 100 includes a passive infrared sensor 102 and a control circuit 104 positioned within an interior of the housing 110. FIG. 2A shows the passive infrared sensor 102 and the control circuit 104 as individual integrated circuit dies. However, the passive infrared sensor 102 and the control circuit 104 may be implemented in a single integrated circuit die. As described previously in relation to FIG. 1, there may be various arrangements of the passive infrared sensor 102 and the control circuit 104 in a single package, in multiple packages, on a printed circuit board, on multiple printed circuit boards, or in other arrangements. Such other arrangements fall within the scope of the present disclosure. As described previously, the passive infrared sensor 102 generates sensor signals indicative of the intensity of infrared radiation 112 on the passive infrared sensor 102. The control circuit 104 analyzes the sensor signals to detect the passage and direction of passage of individuals through the field of view of the sensor device 100.

The sensor device 100 includes a lens 106. The lens 106 is coupled to the housing 110. The lens 106 is also configured to focus infrared radiation 112 onto the passive infrared sensor 102.

The lens 106 includes an asymmetric obstruction 108. The asymmetric obstruction 108 covers a portion of the surface of the lens 106. The result is that the portion of the lens 106 covered by the obstruction 108 is opaque to the infrared radiation 112. The passive infrared sensor 102 will detect little or no infrared radiation 112 from the portion of the lens 106 covered by the asymmetric obstruction 108.

Figure 2B:
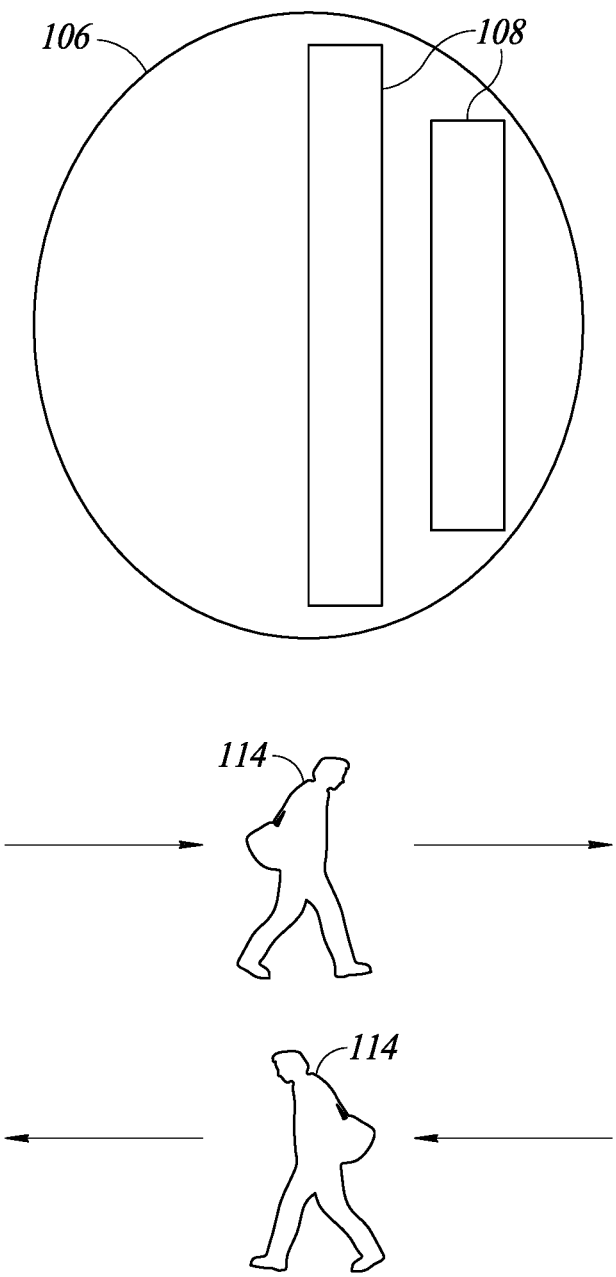
FIG. 2B is an illustration of a lens including an asymmetric obstruction, according to one embodiment.

FIG. 2B illustrates a front view of a lens 106 of a sensor device 100, according to one embodiment. FIG. 2B does not illustrate other components of the sensor device 100. The view of FIG. 2B shows the outside surface of the lens 106.

In FIG. 2B, an asymmetric obstruction 108 is placed on the surface of the lens 106. In the example FIG. 2B, the asymmetric obstruction 108 corresponds to multiple strips of material placed on the surface of the lens 106. The strips of material are separated from each other by gaps. The strips of material are positioned on the right half of the lens 106. The left half of the lens 106 is free of the asymmetric obstruction 108. Accordingly, the asymmetric obstruction 108 is asymmetric in the sense that the right half of the lens 106 is more obstructed than the left half of the lens 106. While FIG. 2B illustrates an asymmetric obstruction 108 including multiple strips of material, such as tape, other types of asymmetric obstructions can be utilized. For example, a single strip of material may be used, a paint may be used, an entire half of the lens 106 may be obstructed, a portion of one half of the lens 106 may be obstructed to a lesser extent than a portion of the other half of the lens 106. Various types of obstructions can be utilized without departing from the scope of the present disclosure.

FIG. 2B also illustrates an individual 114 passing from left to right in front of the lens 106 and another individual passing from right to left in front of the lens 106. As the individual 114 approaches from left to right, the infrared radiation from the individual will initially primarily irradiate the unobstructed left side of the lens 106. As the individual 114 continues past the center of the lens 106, a greater portion of the infrared radiation will irradiate the obstructed right half of the lens 106. The sensor signals generated by the passive infrared sensor 102 will have characteristics over time indicative of the left to right travel. The control circuit 104 can detect the left to right direction of passage of the individual 114.

As the individual 114 approaches from right to left, the infrared radiation from the individual 114 will initially primarily irradiate the obstructed right side of the lens 106. As the individual 114 continues past the center of the lens 106 a greater portion of the infrared radiation will irradiate the unobstructed left half of the lens 106. The passive infrared sensor 102 will generate sensor signals that will have characteristics over time indicative of the right to left travel of the individual 114. The control circuit 104 can detect the right to left direction of passage of the individual 114.

Figure 2C:
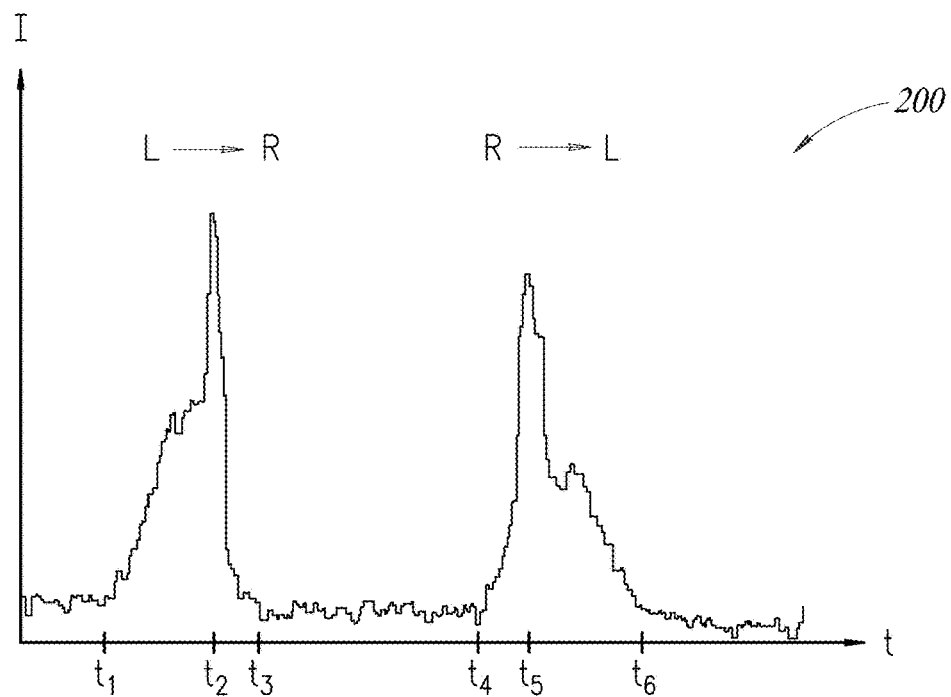
FIG. 2C is a graph of sensor signals from a passive infrared sensor, according to one embodiment.

FIG. 2C illustrates is a graph 200 of sensor signals generated by a passive infrared sensor 102, according to one embodiment. The y-axis of the graph 200 corresponds to the amplitude or intensity of the sensor signals. The x-axis of the graph 200 corresponds to time.

The graph 200 illustrates that an individual passed from left to right in front of the sensor device 100 between times t1 and t3. The graph 200 also illustrates a peak intensity or amplitude at time t2. The graph 200 illustrates that an individual passed from right to left in front of the sensor device 100 between times t4 and t6, with a peak intensity occurring at time t5.

Time t1 corresponds to a time at which the sensor signals from the left to right passage cross above a threshold value. At time t3 corresponds to a time at which the sensor signals from the left to right passage passed below a threshold value. There is a greater time between t1 and t2 than between t2 and t3. This is because between times t1 and t2, the individual is approaching the unobstructed left half of the lens 106, resulting in the passive infrared sensor 102 detecting infrared radiation for a relatively long period of time. As the individual continues between times t2 and t3, suddenly a large amount of the infrared radiation of the individual irradiates the obstructed right half of the lens 106 as the individual passes to the right side of the lens 106. Accordingly, the sensor signal is asymmetric in time between times t1 and t3 in the left to right passage.

Time t4 corresponds to a time at which the sensor signals from the right to left passage cross above a threshold value. Time t6 corresponds to a time at which the sensor signals from the right to left passage passed below a threshold value. There is a greater time between t5 and t6 than between t4 and t5. This is because between times t4 and t5, the individual is approaching the obstructed right half of the lens 106, resulting in little infrared radiation being detected by the passive infrared sensor 102 until the individual suddenly crosses in front of the unobstructed left half of the lens 106. As the individual continues between times t5 and t6, suddenly a large amount of the infrared radiation of the individual irradiates the unobstructed left half of the lens 106 as the individual passes to the left side of the lens 106. Accordingly, the sensor signal is asymmetric in time between times t4 and t6 in the right to left passage.

As can be seen in FIG. 200, the signals associated with the left to right passage have a gradual rise to the peak between times t1 and t2 and a sharp drop-off from the peak between times t2 and t3. The signals associated with the right to left passage have a sharp rise to the peak between times t4 and t5 and the gradual drop-off from the peak between times t5 and t6. The characteristics of the signals enable the control circuit 104 to reliably determine the direction of passage of an individual, as will be set forth in more detail below.

Figure 3:
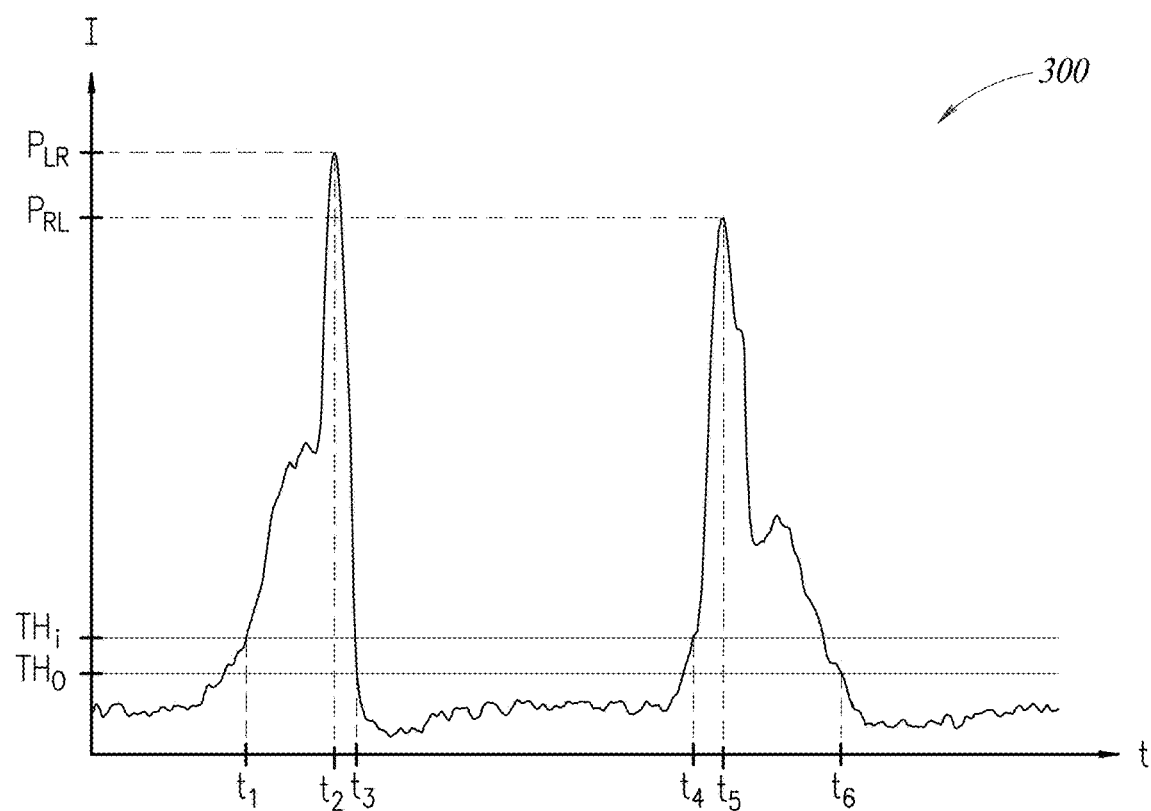
FIG. 3 is a graph of sensor signals from a passive infrared sensor, according to one embodiment.

FIG. 3 is a graph 300 of sensor signals associated with a passive infrared sensor 102, according to one embodiment. The graph 300 is associated with a passive infrared sensor 102 having a lens 106 within asymmetric obstruction primarily on the right half of the lens 106. The graph 300 illustrates two threshold intensities: THi and THo. THi corresponds to a threshold intensity for determining that the passive infrared sensor 102 has begun detecting infrared radiation from an individual passing in front of the passive infrared sensor 102. THo corresponds to a threshold intensity for determining that the individual has effectively passed from the field of view of the passive infrared sensor 102.

The graph 300 illustrates a left to right passage of an individual between times t1 and t3, with a left to right intensity peak PLR at time t2. The left to right passage passes the input threshold THi at time t1. The left to right passage passes the output threshold THo at time t3. The graph 300 illustrates a right to left passage of an individual between times t4 and t6, with a right to left intensity peak PRL at time t5. The right to left passage passes the input threshold THi at time t4. The right to left passage passes the output threshold THo at time t6. The control circuit 104 can utilize the threshold crossing times and intensity peak times to detect passage of individuals and the direction of passage of individuals.

Figure 4A:
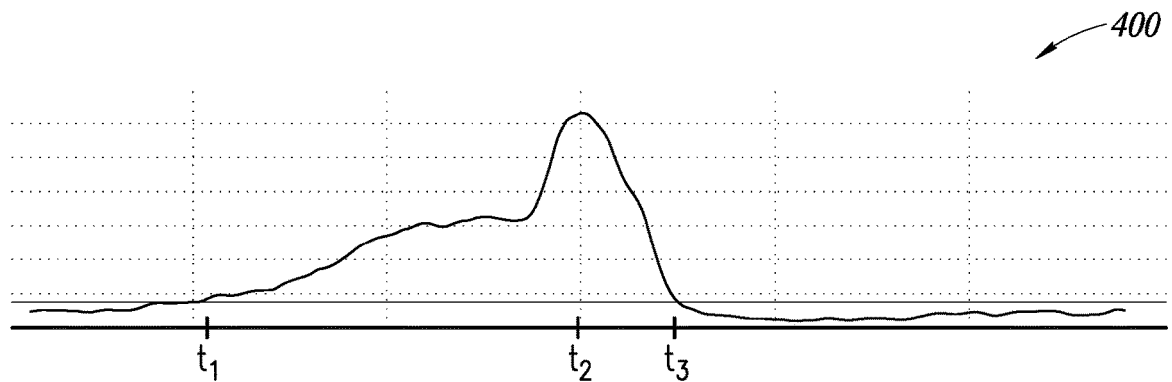
FIGS. 4A-4E are graphs of sensor signals from a passive infrared sensor, according to one embodiment.

FIG. 4A is a graph 400 of sensor signals from a passive infrared sensor 102, according to one embodiment. The graph 400 illustrates a left to right passage of an individual in front of a passive infrared sensor 102 between times t1 and t3. FIG. 4A illustrates a single threshold amplitude with the sensor signals crossing above the threshold amplitude at time t1 and crossing below the threshold amplitude at time t3. However, as described in relation to FIG. 3, a separate input threshold THi and a separate output threshold THo can be utilized to determine times t1 and t3. A peak in intensity occurs at time t2. As will be described in more detail in relation to FIGS. 4B-4E, the control circuit 104 can analyze the sensor signals to detect a passage and the direction of passage.

In one embodiment, the control circuit 104 separately analyzes the sensor signals between times t1 and t2 and the between times t2 and t3 in order to determine whether a passage has occurred, and the direction of passage. In other words, the control circuit 104 separately analyzes the sensor signals prior to the peak (pre) from the sensor signals after the peak (post).

Though not illustrated in FIG. 4A, in one embodiment, the control circuit 104 may first check to determine if the input threshold and the output threshold have both been crossed. If either of the input threshold or the output threshold is not crossed, then the control circuit 104 determines that there is no valid crossing.

In one embodiment, if the input threshold and the output threshold have both been crossed and a valid peak has been detected, then the control circuit 104 may determine if timing thresholds have been met. In particular, the control circuit 104 checks whether the elapsed time between t1 and t2 is greater than a minimum threshold time and less than a maximum threshold time. The control circuit 104 checks whether the elapsed time between t2 and t3 is greater than the minimum threshold time and less than the maximum threshold time. If the elapsed time between t1 and t2 does not fall between the minimum threshold time and the maximum threshold time, then the control circuit 104 determines that there is no valid passage of an individual. If the elapsed time between t2 and t3 does not fall between the minimum threshold time and the maximum threshold time, then the control circuit 104 determines that there is no valid passage of an individual. If the pre-peak and post the timings each satisfy the minimum maximum thresholds, then the control circuit 104 may perform further analysis to detect passage and direction of passage.

Figure 4B:
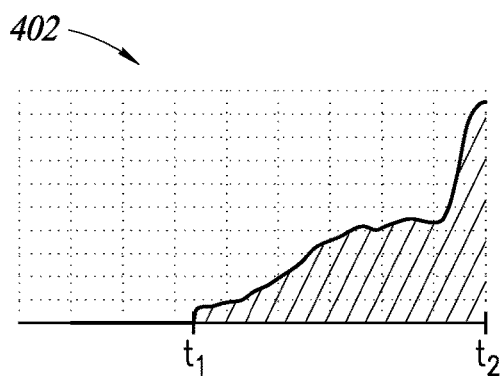

FIG. 4B illustrates a graph 402, according to one embodiment. The graph 402 corresponds to the pre-peak sensor signals between times t1 and t2. More particularly, FIG. 4B illustrates that the control circuit 104 calculates the area (Spre) below the sensor signal between times t1 and t2.

Figure 4C:
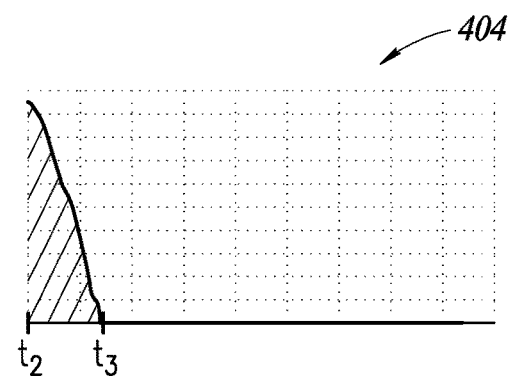

FIG. 4C illustrates a graph 404, according to one embodiment. The graph 404 corresponds to the post-peak sensor signals between times t2 and t3. More particularly, FIG. 4B illustrates that the control circuit 104 calculates the area (Spost) below the sensor signal between times t2 and t3.

In one embodiment, the control circuit 104 calculates the ratio R of the pre-peak area in the post-peak area. The control circuit 104 may calculate the ratio R in accordance with the following formula:

$$R = Spre/(Spre+Spost).$$

The control circuit 104 may then compare the ratio R to a minimum threshold ratio and a maximum threshold ratio. If the ratio R is greater than the minimum threshold ratio and less than the maximum threshold ratio, the control circuit 104 determines that a valid passage has occurred. If the ratio R is less than the minimum threshold ratio or greater than the maximum threshold ratio, then the control circuit 104 determines that no valid passage has occurred. In one embodiment, the minimum threshold ratio has a value between 0.1 and 0.2. In one embodiment, the maximum threshold ratio has a value between 0.8 and 0.9. Other minimum and maximum threshold ratios can be utilized without departing from the scope of the present disclosure. Other formulas for calculating R can be utilized without departing from the scope of the present disclosure In one embodiment, the control circuit 104 determines the direction of passage based on the value of the ratio R. In particular, if R is greater than 0.5, then the direction of passage is from left to right. If R is less than 0.5, then the direction of passage is from right to left. If R is equal to 0.5, then the control circuit 104 may be programmed to determine left to right passage or right to left passage. Other standards can be utilized for determining left to right or right to left passage without departing from the scope of the present disclosure.

Figure 4D:
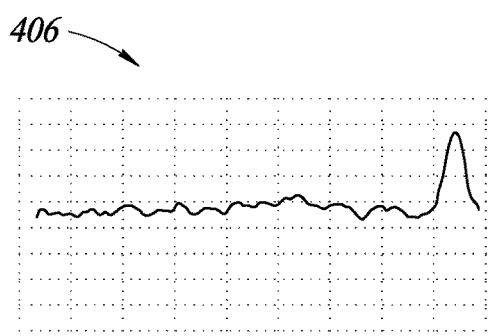

FIG. 4D illustrates a graph 406, according to one embodiment. The graph 406 corresponds to the calculation of the derivative of the sensor signal between times t1 and t2. The control circuit can calculate the derivative. In one embodiment, the control circuit detects any negative peaks in the pre-peak derivative (there are none in FIG. 4D), then the control circuit 104 determines that there is not a valid crossing. In other words, the control circuit 104 may determine that a valid crossing has occurred only if there are no negative peaks in the pre-peak derivative.

Figure 4E:
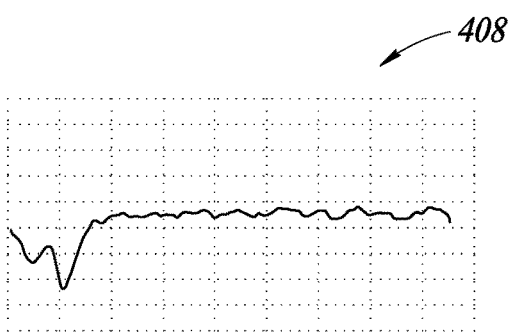

FIG. 4E illustrates a graph 408, according to one embodiment. The graph 408 corresponds to the calculation of the derivative of the sensor signal between times t2 and t3. In one embodiment, if the control circuit 104 detects any positive peaks in the pre-peak derivative (there are none in FIG. 4E), then the control circuit 104 determines that there is not a valid crossing. In other words, the control circuit 104 may determine that a valid crossing is occurred only if there are no positive peaks in the post-peak derivative.

In one embodiment, FIGS. 4A-4E represent a valid left to right passage of an individual through the field of view of a passive infrared sensor 102. In other words, the sensor signals of the graph 400 and the subsequently generated graphs 404, 406, and 408 satisfy all of the amplitude, timing, and ratio thresholds, as well as having no negative peaks in the pre-peak derivative and no positive peaks in the post-peak derivative. The control circuit 104 can utilize all of the threshold, only a subset of the threshold, or different types of thresholds or rules than described herein without departing from the scope of the present disclosure.

FIG. 5A illustrates a graph 500 corresponding to sensor signals associated with a right to left crossing of an individual through the field of view of a passive infrared sensor 102 between times t1 and t3, according to one embodiment. FIG. 5B is a graph 502 of the pre-peak area, according to one embodiment. FIG. 5C is a graph 504 of the post-peak area, according to one embodiment. FIG. 5D is a graph 506 of the pre-peak derivative, according to one embodiment. FIG. 5B is a graph 508 of the post-peak derivative, according to one embodiment.

The control circuit 104 may utilize the same calculations and threshold comparisons to determine whether a valid passage has occurred for FIGS. 5A-5E, as described in relation to FIGS. 4A-4E. In the example of FIGS. 5B and 5C, the ratio R is less than 0.5, resulting in a determination by the control circuit 104 that a right to left crossing has occurred. All of the other threshold comparisons are derivative constraints are satisfied, such that a valid right to left crossing is determined by the control circuit 104.

Figure 6A:
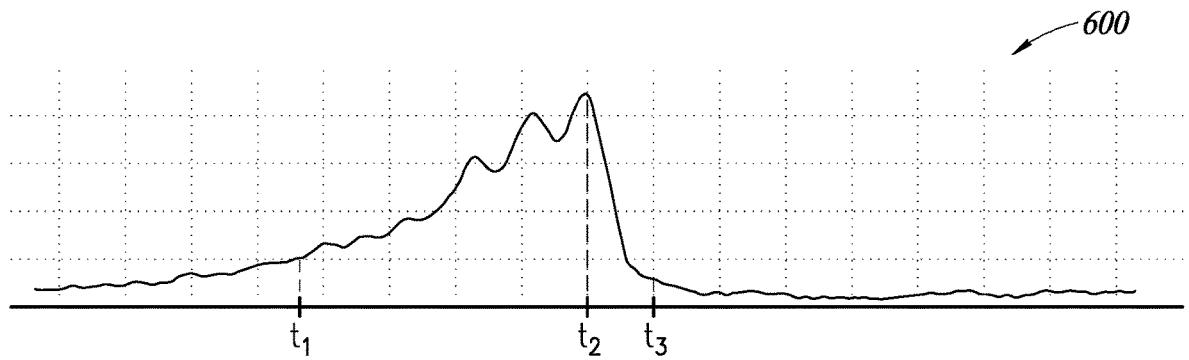
FIG. 6A-6E are graphs of sensor signals from a passive infrared sensor, according to one embodiment.
Figure 6B:
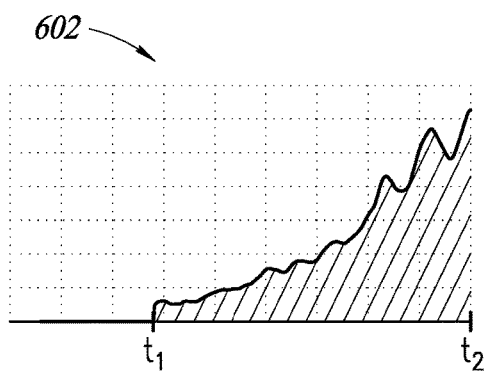
Figure 6C:
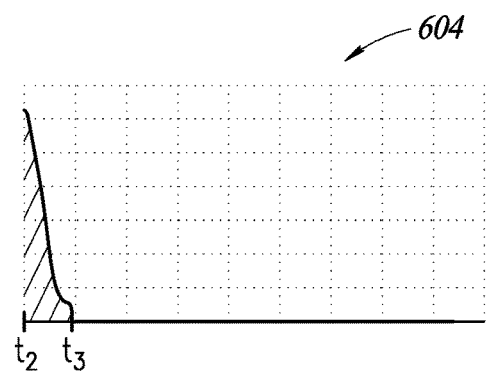
Figure 6D:
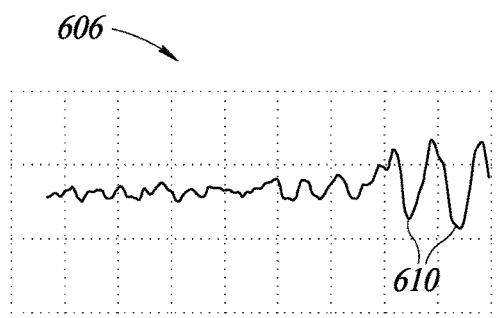
Figure 6E:
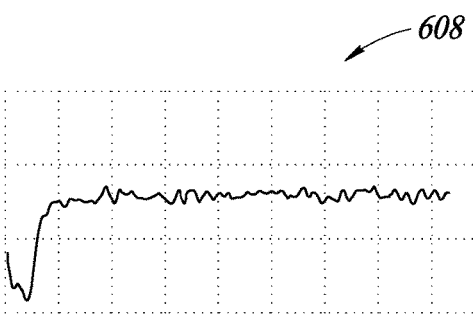

FIG. 6A illustrates a graph 600 corresponding to sensor signals associated with a left to right crossing of an individual through the field of view of a passive infrared sensor 102 between times t1 and t3, according to one embodiment. FIG. 6B is a graph 602 of the pre-peak area, according to one embodiment. FIG. 6C is a graph 604 of the post-peak area, according to one embodiment. FIG. 6D is a graph 606 of the pre-peak derivative, according to one embodiment. FIG. 6E is a graph 608 of the post-peak derivative, according to one embodiment.

The control circuit 104 may utilize the same calculations and threshold comparisons to determine whether a valid passage has occurred for FIGS. 6A-6E, as described in relation to FIGS. 4A-4E. In the example of FIG. 6D, the graph 606 illustrates two negative peaks 610 in the pre-peak derivative. Even though all other threshold conditions are satisfied, the control circuit 104 determines that a valid crossing has not occurred because there are negative peaks in the pre-peak derivative.

Figure 7:
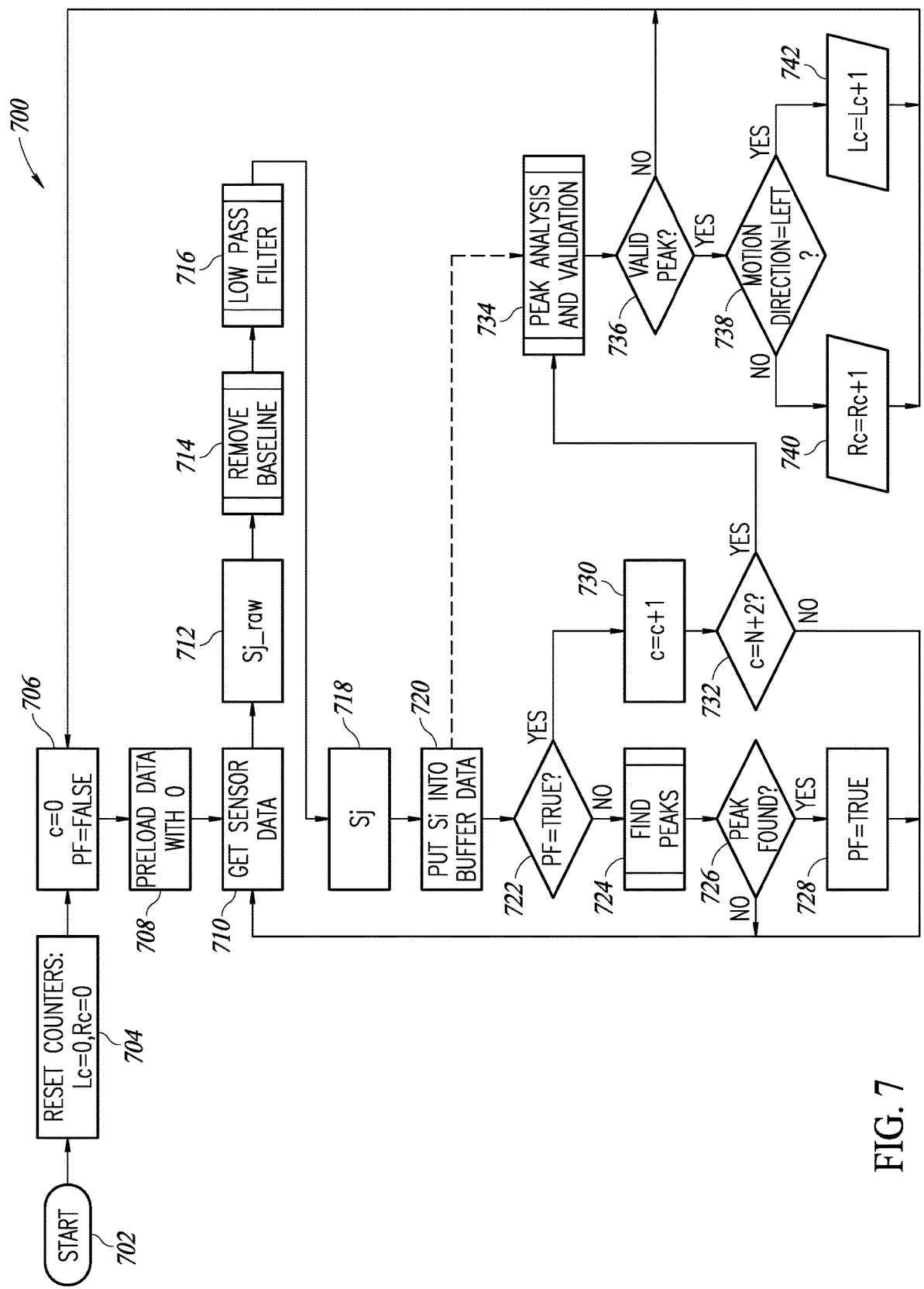
FIG. 7 is a flow diagram of a method for operating a sensor device, according to one embodiment.

FIG. 7 is a flow diagram of a process 700 for operating a control circuit 104 of a sensor device 100, according to one embodiment. The process 700 can be utilized in accordance with the devices, components, and processes described in relation to FIGS. 1-6E. The process 700 can be utilized to count the number Lc of valid left to right crossings and the number Rc of valid right to left crossings.

At 702, the process 700 begins. At 704, the counter values Lc and Rc are reset. At 706, the samples counter c is set to 0. The variable PF is set to "false". If PF is set to false, this indicates that a valid peak has not yet been found. At 708, a buffer B is preloaded with 0 values.

At 710, the control circuit 104 receives sensor data from the passive infrared sensor 102. Alternatively, 710 can correspond to the generation of sensor data by the control circuit 104 from analog sensor signals provided by the passive infrared sensor 102. At 712 the next raw (unprocessed) data sample Sj_raw is retrieved. At 714 a first processing step of the raw data sample is performed by removing the baseline from the raw data sample. At 716, a next processing step of the raw data sample is performed by passing the raw data sample through a low-pass filter. In 714 and 716, the baseline removal and filtering processes use the whole samples in the buffer B, taking into account the newly incoming Sj_raw as well. Accordingly, the baseline is calculated on the basis of the data in the buffer B and subtracted to Sj_raw. The low pass filter may be a recursive filter, such as an infinite impulse response (IIR) filter that uses the last sample and some of the previous samples to compute the filtered sample Sj. The result is that a processed data sample Sj is obtained at 718.

At 720, the process data sample Sj is placed into buffer data for analysis. At 722, the control circuit determines whether a valid peak has been found in the sensor data. If no valid peak has been found at 722, then at 724 the control circuit 104 attempts to find a peak. At 726, if no peak has been found in the process returns to 710. If a peak is found at 726, then at 728 PF is set to true and the process returns to 710. If at 722 PF is true, then at 730 the sample counter value c is incremented by 1.

At 722, the control circuit determines whether the sample counter value c is equal to N+2. If c is not equal to N+2, then the process returns to 710. If c is equal to N+2, then at 734 the control circuit 104 performs peak analysis and validation. At 736, if a valid peak has not been found, then the process returns to 706. At 736, if a valid peak has been found, then at 738 the control circuit 104 determines whether the direction is left to right or right to left. If the direction is left to right, then the left to right crossing counter value Lc is incremented by 1 at 742. If the direction of passage is right to left, then the right to left crossing counter value Rc is incremented by 1 at 740. The process 700 then returns to 706. Other process steps and combinations of steps can be utilized in the process 700 without departing from the scope of the present disclosure.

Figure 8:
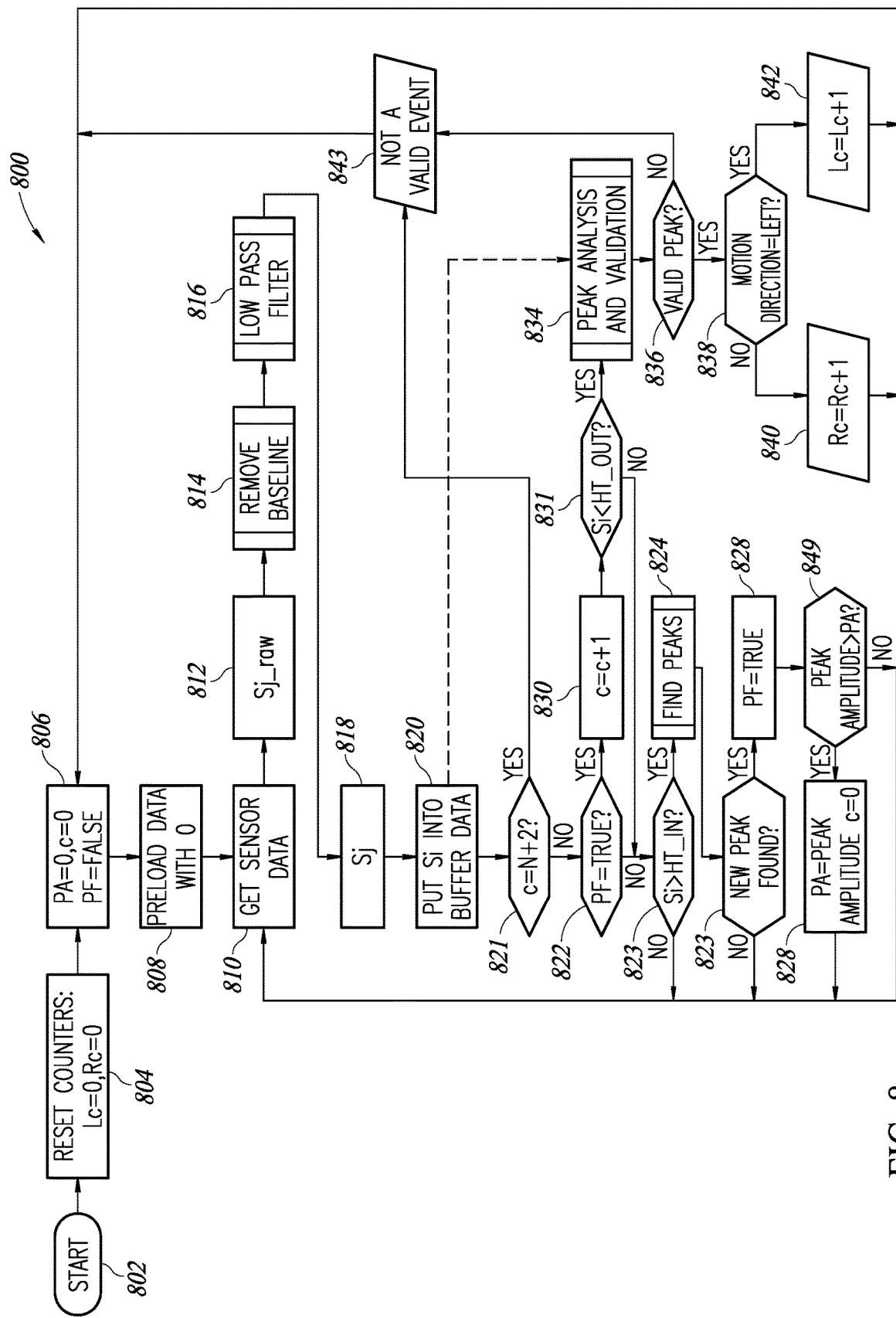
FIG. 8 is a flow diagram of a method for operating a sensor device, according to one embodiment.

FIG. 8 is a flow diagram of a process 800 for operating a control circuit 104 of a sensor device 100, according to one embodiment. The process 800 can be utilized in accordance with the devices, components, and processes described in relation to FIGS. 1-7. The process 800 can be utilized to count the number Lc of valid left to right crossings and the number Rc of valid right to left crossings Rc.

At 802, the process 800 begins. At 804, the counter values Lc and Rc are reset. At 806, the samples counter c is set to 0. The variable PF is set to "false". If PF is set to false, this indicates that a valid peak has not yet been found. The value of the variable PA, corresponding to the current peak amplitude, is set to 0. At 808, registers, buffers, or other types of memories that store the current set of sensor data are preloaded with 0 values.

At 810, the control circuit 104 receives sensor data from the passive infrared sensor 102. Alternatively, 810 can correspond to the generation of sensor data by the control circuit 104 from analog sensor signals provided by the passive infrared sensor 102. At 812 the next raw (unprocessed) data sample Sj_raw is retrieved. At 814 a first processing step of the raw data sample is performed by removing the baseline from the raw data sample. At 816, a next processing step of the raw data sample is performed by passing the raw data sample through a low-pass filter. At 814 and 816, the baseline removal and filtering processes use the whole samples in the buffer B, taking into account the newly incoming Sj_raw as well. Accordingly, the baseline is calculated on the basis of the data in the buffer B and subtracted to Sj_raw. The low pass filter may be a recursive filter, such as an infinite impulse response (IIR) filter that uses the last sample and some of the previous samples to compute the filtered sample Sj. The result is that a processed data sample Sj is obtained at 818.

At 820, the process data sample Sj is placed into buffer data for analysis. At 821, the control circuit 104 checks whether c is equal to N+2. If c is not equal to N+2, then the process proceeds to 822. If c is equal to N+2 at 821, then the control circuit determines that a valid crossing has not occurred at 843.

At 822, the control circuit determines whether a valid peak has been found in the sensor data. If no valid peak has been found at 822, then at 823 the control circuit determines whether the Sj is greater than the input threshold value THi. If Sj is not greater than THi, then the process returns to 810. If Sj is greater than THi, then at 824 the control circuit 104 attempts to find a peak. At 827, if no peak has been found then the process returns to 810. If a peak is found at 827, then at 828 PF is set to true. At 849, the control circuit determines whether the peak amplitude is greater than PA. If the peak amplitude is not greater than PA, then the process returns to 810. If the peak amplitude is greater than PA, then at 829 PA is sent to the value of the peak amplitude and c is set to 0. From 829 the process returns to 810.

If at 822 PF is true, then at 830 the sample counter value c is incremented by 1. At 831, the control circuit 104 determines whether or not Si is less than THo. If Si is not less than THo, then the process returns to 823. If Si is less than THo, then at 834 the control circuit 104 performs peak analysis and validation.

At 836, if a valid peak has not been found, then at 843 it is determined that a valid crossing has not occurred. From 843 the process returns to 806. At 836, if a valid peak has been found, then at 838 the control circuit 104 determines whether the direction is left to right or right to left. If the direction is left to right, then the left to right crossing counter value Lc is incremented by 1 at 842. If the direction of passage is right to left, then the right to left crossing counter value Rc is incremented by 1 at 840. The process 800 then returns to 806. Other process steps and combinations of steps can be utilized in the process 800 without departing from the scope of the present disclosure.

Figure 9:
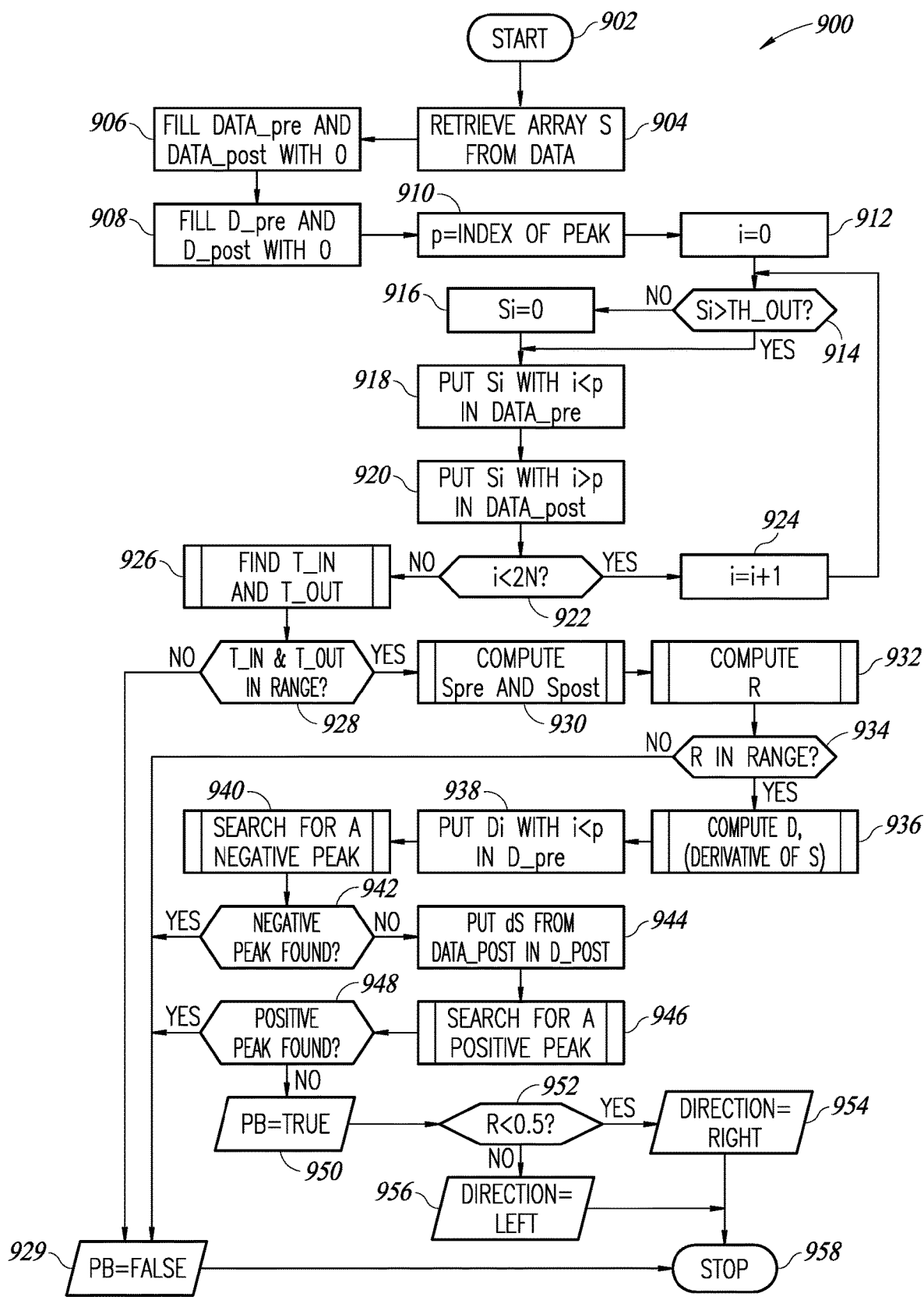
FIG. 9 is a flow diagram of a method for operating a sensor device, according to one embodiment.

FIG. 9 is a flow diagram of a process 900 for operating a control circuit 104 of a sensor device 100, according to one embodiment. The process 900 can be utilized in accordance with the devices, components, and processes described in relation to FIGS. 1-8.

At 902, the process 900 begins. At 904, an array of sensor data values S is retrieved. At 906, the pre-peak data values DATA_pre and the post-peak data values DATA_post are filled with 0. At 908, the pre-peak derivative values D_pre and the post-peak derivative values D_post are filled with 0. At 910, the variable p is set to the index of the peak. At 912, the value i is set to 0. At 914, the control circuit checks whether the data value Si is greater than THo. If Si is not greater than THo, then at 916 Si is set to 0. If Si is greater than THo, then at 918 Si with i<p is put in DATA_pre.

At 920 Si with i>p is put in DATA_post. At 922 the control circuit 104 checks whether i is greater than 2N. If i is less than 2N, then at 924 the value of i is incremented by 1. If i is not less than 2N then at 926 the control circuit finds the beginning of the pre-peak time T_in and the ending of the post-peak time T_out.

At 928, the control circuit 104 determines whether T_in and T_out are in range. If not, then at 929 PB is set to false and at 958 the process stops. If T_in and T_out are in range at 928, then at 930 the control circuit 104 computes the pre-peak area Spre and the post-peak area Spost. At 932, the control circuit computes the ratio R. At 934, if the ratio R is not in range, then at 929 PB is set to false. If R is in range at 934, then at 936 the control circuit 104 computes the derivative D of S.

At 938 Di with i<p are put in D_pre. At 940, the control circuit 104 searches for a negative peak. At 942 if a negative peak is found, then at 929 PB is set to false. If a negative peak is not found at 942, then at 944 dS from DATA_post are put in D_post. At 946, the control circuit 104 searches for a positive peak. At 948 is a positive peak is found that 929 PB is set to false. If a positive peak is not found that 948, and 950 PB is set to true.

At 952 if R is less than 0.5, then at 954 of the crossing direction is set to right. If R is not less than 0.5, then at 956 the direction is set to left. The process then stops at 958. Other process steps and combinations of steps can be utilized in the process 900 without departing from the scope of the present disclosure.

Figure 10:
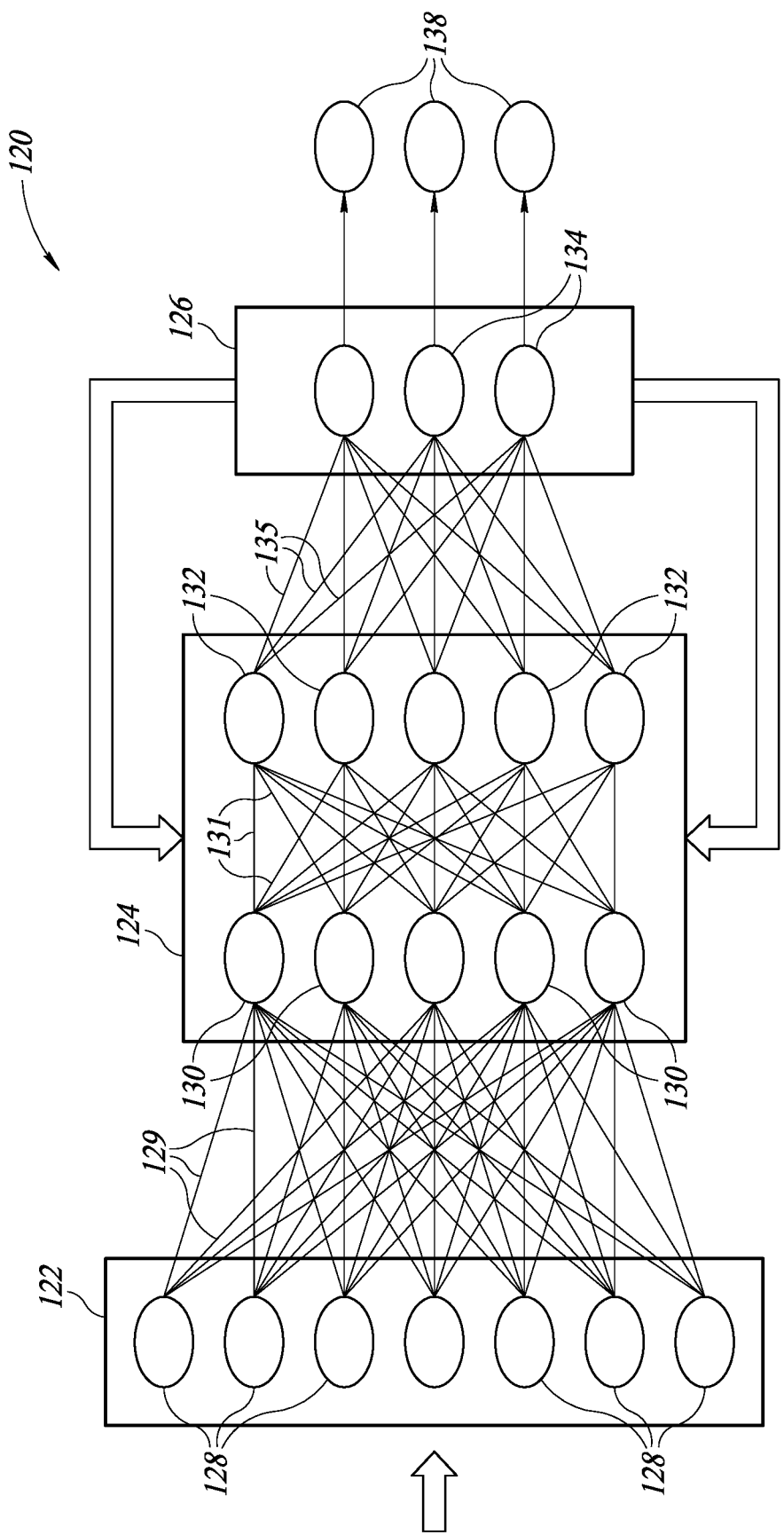
FIG. 10 is a block diagram of an analysis model of a sensor device, according to one embodiment.

FIG. 10 is a block diagram of an analysis model 120, according to one embodiment. The analysis model 120 is part of the control circuit 104 or is utilized by the control circuit 104 to detect valid crossings in the field of view of the passive infrared sensor 102 and the direction of the crossings. The analysis model 120 can be used instead of or in addition to the various processes and algorithms described in relation to FIGS. 1-9 to determine whether crossings have occurred and the directions of the crossings.

The analysis model 120 is trained with a machine learning process to classify sensor data into one of three classifications: no passing, passing direction 1 (e.g. left to right), or passing direction 2 (e.g. right to left). The machine learning process will be described in more detail further below in relation to FIG. 12.

In one embodiment, the analysis model 120 includes a neural network. In the example of FIG. 10, the neural network includes an input layer 122, a hidden layer 124, and the output layer 126. The input layer receives sets of sensor data. Each set of sensor data corresponds to sensor signals from the passive infrared sensor 102 over a particular range of time. Each set of sensor data can correspond to a vector, a set of vectors, a matrix, a tensor, or other types of data sets. In the example of FIG. 10, the input layer 122 includes seven neurons 128, though in practice the input layer 122 can include other numbers of neurons without departing from the scope of the present disclosure. The neurons in the input layer are connected to a seven neurons 130 of the hidden layer 124 by edges 129. The edges correspond to weighting values that are trained during the machine learning process.

The hidden layer 124 includes neurons five 130 and five 132. The neurons 130 and 132 are connected to each other by edges 131 corresponding to weighting values that are trained during the machine learning process. Other numbers of neurons 130 and 132 can be utilized without departing from the scope of the present disclosure. The neurons 132 of the hidden layer 124 are connected to the neurons 134 of the output layer 126 by edges 135 corresponding to weighting values that are trained during the machine learning process.

The output layer 126 can output one of three classifications for each sensor data set. A first classification can indicate that the sensor data set does not represent a valid crossing. A second classification can indicate that the sensor data set represents a left to right crossing. A third classification can indicate that the sensor data set represents a right to left crossing. The output layer 126 has three neurons 134 because there are three possible classifications. However, in other embodiments different numbers of classifications may be utilized in these cases, different numbers of neurons 134 may be utilized in the output layer 126.

FIG. 10 illustrates a single hidden layer 124. In practice, there may be more hidden layers 124 than shown in FIG. 10. Furthermore, other types of neural networks with different configurations of layers can be utilized without departing from the scope of the present disclosure.

Figure 11:
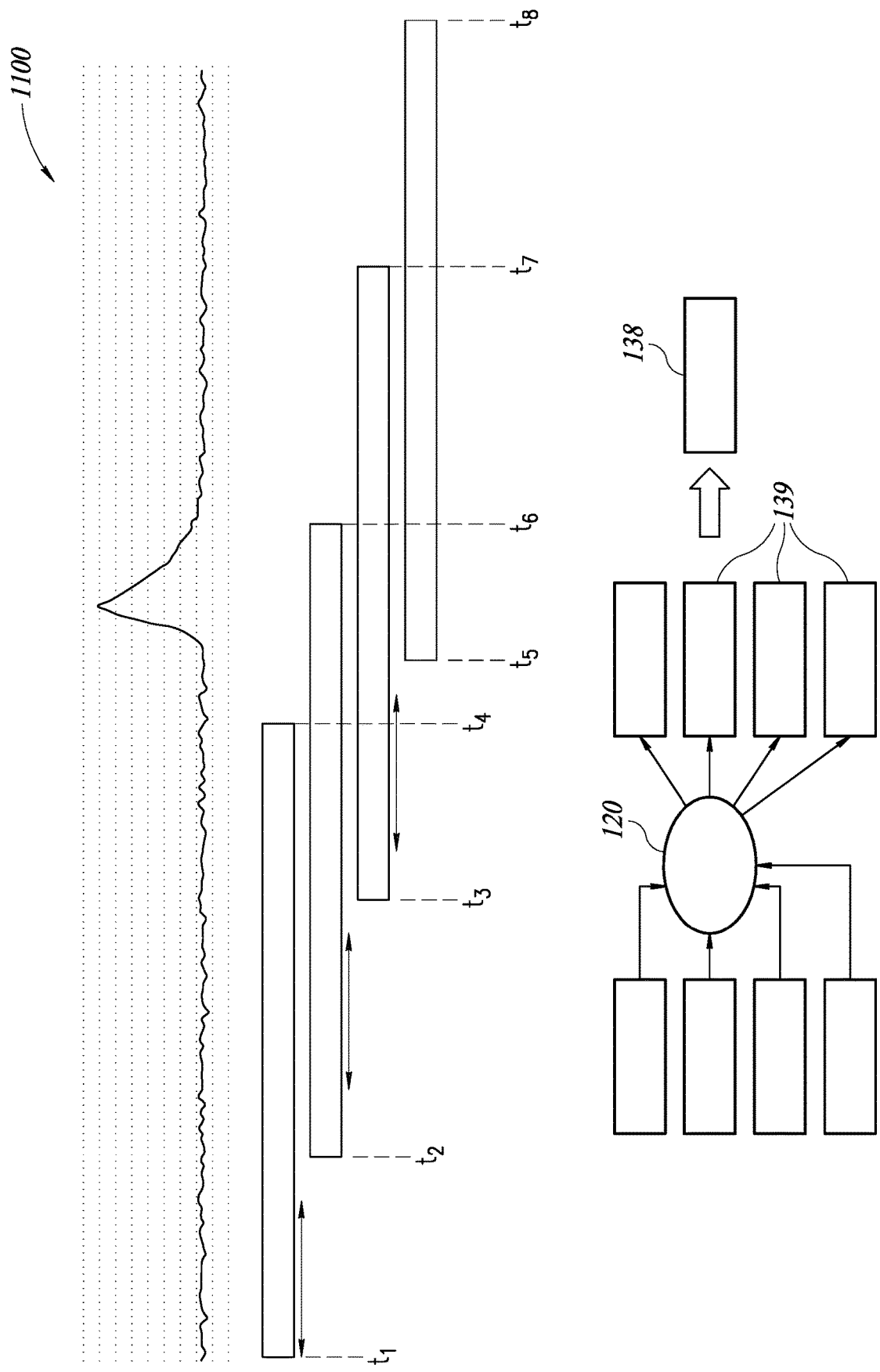
FIG. 11 illustrates operational principles of the analysis model, according to one embodiment.

FIG. 11 illustrates a process 1100 for determining crossings with an analysis model 120 according to one embodiment. FIG. 11 illustrates four overlapping timing windows between time t1 and t8. FIG. 11 also illustrates the sensor signals between times t1 and t8. The first timing window occurs between times t1 and t4. The second timing window occurs between times t2 and t6. The third timing window occurs between times t3 and t7. The fourth timing window occurs between times t5 and t8. A peak in the sensor signals occurs between times t5 and t6. In one example, each timing window has a duration of six seconds, though other values can be utilized without departing from the scope of the present disclosure.

The sensor data for each timing window is fed into the analysis model 120. The analysis model 120 then generates a respective classification 139 for each timing window. The analysis model 120 generates an overall classification 138 that indicates whether or not a valid crossing has occurred during the fourth timing windows. This process can continually repeat during operation of the passive infrared sensor.

In one embodiment, each timing window is three seconds and includes 90 data points. This corresponds to an output data rate of 30 Hz. The beginning of each window is separated from the beginning of the next window by one second. The analysis model 120 outputs a classification once per second. Other timings and data rates can be utilized without departing from the scope of the present disclosure. In one embodiment, there can be event segmentation among multiple windows.

In one embodiment, a first data acquisition window may include six seconds of data and an output data rate of 30 Hz for a total number of 180 data points. A next acquisition window can include four seconds. The analysis model can run on the two final seconds of the previous acquisition and the new four seconds of the current acquisition. The analysis model 120 can output a classification every four seconds. Other timings, data rates, and window lengths can be utilized without departing from the scope of the present disclosure.

Figure 12:
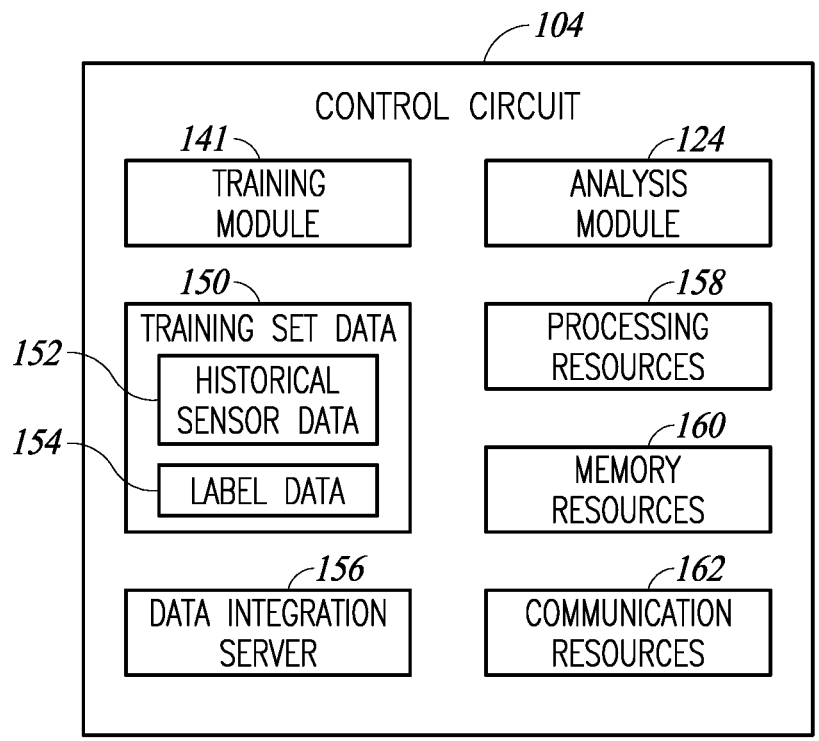
FIG. 12 is a block diagram of a control circuit of a sensor device, according to one embodiment.

FIG. 12 is a block diagram of the control circuit 104 of FIG. 1, according to one embodiment. The control circuit 104 is configured to analyze sensor signals from the passive infrared sensor 102 in order to determine whether there are valid crossings and the direction of each crossing, according to one embodiment.

In one embodiment, the control circuit 104 includes an analysis model 120 and a training module 141. The training module 141 trains the analysis model 120 with a machine learning process. The machine learning process trains the analysis model 120 to classify sensor data as representing no crossing, crossing in the first direction, or crossing in a second direction.

The control circuit 104 includes, or stores, training set data 150. The training set data 150 includes historical sensor data 152 and label data 154. The historical sensor data 152 includes a plurality of sets of previously recorded sensor data. Each set of previously recorded sensor data corresponds to sensor data collected for a particular period of time. The label data 154 includes a label for each set of sensor data in the historical sensor data. Each label corresponds to a classification for the set of sensor data. The classification is either no valid crossing, crossing in direction one, or crossing in direction two.

The process for gathering the training set data can include deliberately running the passive infrared sensor 102 and sending individuals to walk past the passive infrared sensor 102 in both directions. The gathering the training set can include recording the time period of each crossing and the direction of each crossing. The sensor data associated with each period of time can be labeled based on whether no crossing occurred, a crossing in direction one has occurred, or a crossing in direction two occurred.

In one embodiment the analysis model 120 includes a neural network. Training of the analysis model 120 will be described in relation to a neural network. However, other types of analysis models or algorithms can be used without departing from the scope of the present disclosure. The training module 141 utilizes the training set data 150 to train the neural network with a machine learning process. During the training process, the neural network receives, as input, the historical sensor data 152 from the training set data.

During the training process, the neural network generates a classification for each sensor data set from the historical sensor data 152.

During training, the control circuit 104 compares, for each set of sensor data, the predicted classification to the actual classification from the label data 154. The control circuit generates an error function indicating how closely the predicted classifications match the label data. The control circuit 104 then adjusts the internal functions (weighting values corresponding to the edges) of the neural network. Because the neural network generates predicted classifications based on the internal functions, adjusting the internal functions will result in the generation of different predicted classifications for a same set of sensor data. Adjusting the internal functions can result in predicted classifications that produces larger error functions (worse matching to the historical sensor data 152) or smaller error functions (better matching to the historical sensor data 152).

After adjusting the internal functions of the neural network, the historical sensor data 152 is again passed to the neural network and the analysis model 120 again generates predicted classifications. The training module 141 again compares the predicted classifications to the label data. The training module 141 again adjusts the internal functions of the neural network. This process is repeated in a very large number of iterations of monitoring the error functions and adjusting the internal functions of the neural network until a set of internal functions is found that results in predicted classifications that matches the label data 154 across the entire training set.

At the beginning of the training process, the predicted classifications likely will not match the label data 154 very closely. However, as the training process proceeds through many iterations of adjusting the internal functions of the neural network, the errors functions will trend smaller and smaller until a set of internal functions is found that results in predicted classifications that match the label data 154. Identification of a set of internal functions that results in predicted classifications that matches the label data 154 corresponds to completion of the training process.

In one embodiment, the control circuit 104 includes processing resources 158, memory resources 160, and communication resources 162. The processing resources 158 can include one or more controllers or processors. The processing resources 158 are configured to execute software instructions, process data, perform signal processing, read data from memory, write data to memory, and to perform other processing operations.

In one embodiment, the memory resources 160 can include one or more computer readable memories. The memory resources 160 are configured to store software instructions associated with the function of the control circuit and its components, including, but not limited to, the analysis model 120. The memory resources 160 can store data associated with the function of the control circuit 104 and its components. The data can include the training set data 150, sensor data, and any other data associated with the operation of the control circuit 104 or any of its components.

In one embodiment, the communication resources can include resources that enable the control circuit 104 to communicate with components associated with the sensor device 100 and with external systems. For example, the communication resources 162 can include wired and wireless communication resources that enable the control circuit 104 to receive the sensor data and to communicate with external systems.

In one embodiment, the analysis model 120 is implemented via the processing resources 158, the memory resources 160, and the communication resources 162.

Figure 13:
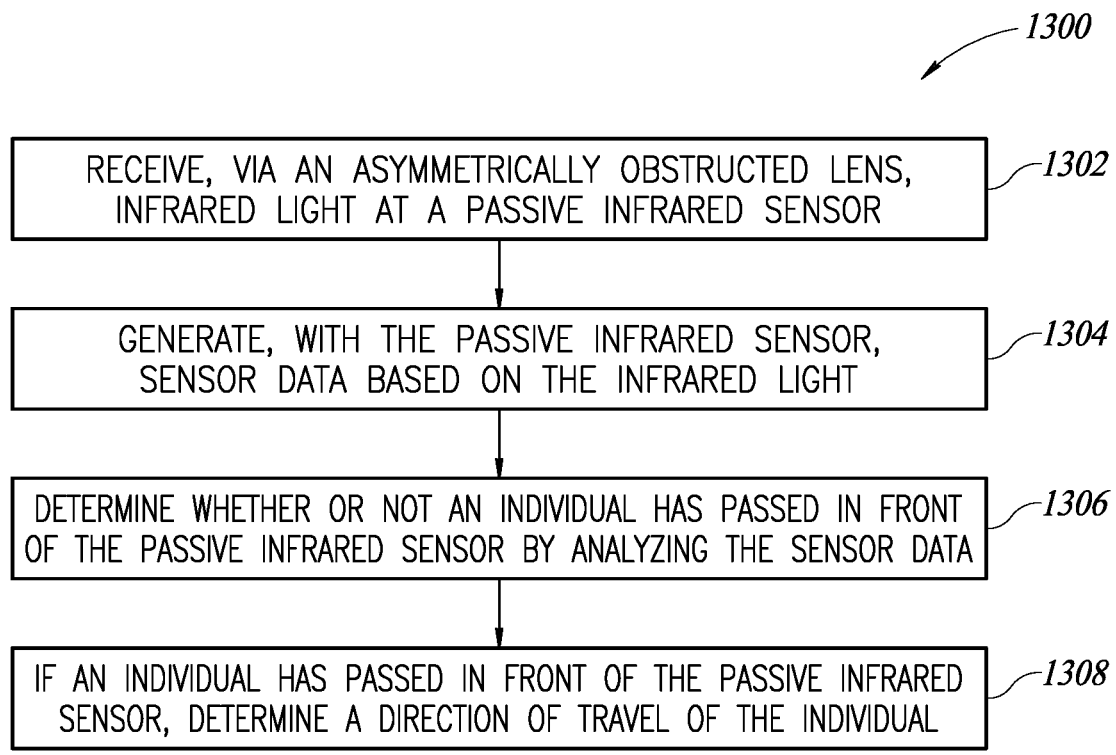
FIG. 13 is a flow diagram of a method for operating a sensor device, according to one embodiment.

FIG. 13 is a flow diagram of a method 1300 for operating a sensor device, according to one embodiment. The method 1300 can utilize systems, components, and processes described in relation to FIGS. 1-12. At 1302, the method 1300 includes receiving, via an asymmetrically obstructed lens, infrared radiation at a passive infrared sensor. At 1304, the method 1300 includes generating, with the passive infrared sensor, sensor data based on the infrared radiation. At 1306, the method 1300 includes determining whether or not an individual has passed in front of the passive infrared sensor by analyzing the sensor data. At 1308, the method 1300 includes if an individual has passed in front of the passive infrared sensor, determining a direction of travel of the individual.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   receiving, via an asymmetrically obstructed lens, infrared radiation at a passive infrared sensor;
   generating, with the passive infrared sensor, sensor data based on the infrared radiation;
   determining whether or not an individual has passed in front of the passive infrared sensor by analyzing the sensor data; and
   if an individual has passed in front of the passive infrared sensor, determining a direction of travel of the individual, wherein analyzing the sensor data includes:
   detecting an intensity peak in the sensor data; and
   comparing a first portion of the sensor data preceding the intensity peak to a second portion of the sensor data succeeding the intensity peak.

2. The method of claim 1, further comprising determining the direction of travel of the individual based on an asymmetry between the first portion of the sensor data and the second portion of the sensor data.

3. The method of claim 2, further comprising:
   determining a start time for analysis an of the sensor data by detecting when the first portion of the sensor data crosses a first threshold intensity; and
   determining a stop time for the analysis of the sensor data by detecting when the first portion of the sensor data crosses a second threshold intensity.

4. The method of claim 3, wherein the sensor data defines an intensity curve, the method further comprising:
   computing a first area under the intensity curve for the first portion of the sensor data;
   computing a second area under the intensity curve for the second portion of the sensor data; and
   comparing the first portion of the sensor data to the second portion of the sensor data by calculating a ration of the first area and the second area.

5. The method of claim 4, further comprising determining the direction of travel of the individual based on a value of the ratio.

6. The method of claim 4, further comprising determining that an individual has not passed in front of the passive infrared sensor if the ratio does not fall between a first threshold ratio and a second threshold ratio.

7. The method of claim 4, further comprising:
   computing a derivative of the intensity curve; and
   determining that an individual has not passed in front of the passive infrared sensor if there are negative peaks in the derivative of the intensity curve of the first portion of the sensor data or if there are positive peaks in the derivative of the intensity curve of the second portion of the sensor data.

8. The method of claim 1, further comprising determining that an individual has not passed in front of the passive infrared sensor if either the first portion of the sensor data or the second portion of the sensor data has a duration that does not fall between a first threshold duration and a second threshold duration.

9. The method of claim 1, wherein analyzing the sensor data includes passing the sensor data to an analysis model trained with a machine learning process.

10. A device, comprising:
    a passive infrared sensor;
    a lens positioned to direct infrared radiation onto the passive infrared sensor;
    an obstruction that asymmetrically inhibits a transmission of the infrared radiation though the lens, wherein the passive infrared sensor generates sensor data based on the infrared radiation; and
    a control circuit configured to determine whether or not an individual has passed in front of the passive infrared sensor, and a direction of travel of the individual, by analyzing the sensor data, wherein the control circuit includes an analysis model trained with a machine learning process to determine whether or not an individual has passed in front of the passive infrared sensor, and a direction of travel of the individual, by analyzing the sensor data.

11. The device of claim 10, wherein the obstruction includes an opaque material coupled to a surface of the lens.

12. The device of claim 11, wherein the opaque material includes a tape.

13. The device of claim 11, wherein the opaque material includes a plurality of stripes of the opaque material.

14. The device of claim 10, wherein the obstruction includes scratches on the lens.

15. The device of claim 10, wherein the passive infrared sensor includes a single pixel passive infrared sensor.

16. The device of claim 10, wherein the analysis model works on a time limited window of the sensor data.

17. A method, comprising:
    placing, on a lens, an obstruction that asymmetrically inhibits a transmission of infrared radiation through the lens;
    coupling the lens to a passive infrared sensor;
    directing infrared radiation onto the passive infrared sensor with the lens;
    generating sensor data with the passive infrared sensor based on the infrared radiation; and
    determining a direction of a travel of an individual based on asymmetries in the sensor data.

18. The method of claim 17, wherein the obstruction is positioned to generate the asymmetries in the sensor data.

19. The method of claim 17, wherein the determining the direction of a travel of the individual based on the asymmetries in the sensor data includes:
    detecting an intensity peak in the sensor data; and comparing a first portion of the sensor data preceding the intensity peak to a second portion of the sensor data succeeding the intensity peak.

20. The method of claim 19, wherein the determining the direction of a travel of the individual based on the asymmetries in the sensor data further includes identifying the asymmetries between the first portion of the sensor data and the second portion of the sensor data.

* * * * *

UNITED STATES PATENT AND TRADEMARK OFFICE
CERTIFICATE OF CORRECTION

| | | |
|---|---|---|
| PATENT NO. | : 12,367,745 B2 | Page 1 of 1 |
| APPLICATION NO. | : 18/061918 | |
| DATED | : July 22, 2025 | |
| INVENTOR(S) | : Enrico Rosario Alessi et al. | |

It is certified that error appears in the above-identified patent and that said Letters Patent is hereby corrected as shown below:

In the Claims

<u>Column 17, Claim 3, Line 50:</u>
"time for analysis an of the"
Should read:
--time for an analysis of the--.

Signed and Sealed this
Thirtieth Day of September, 2025

John A. Squires
*Director of the United States Patent and Trademark Office*